UNITED STATES PATENT OFFICE.

HENRY A. KOHMAN, OF PITTSBURGH, PENNSYLVANIA.

FERMENT AND PROCESS FOR PRODUCING AND PRESERVING THE SAME.

1,149,839. Specification of Letters Patent. Patented Aug. 10, 1915.

No Drawing. Application filed June 21, 1912. Serial No. 705,137.

*To all whom it may concern:*

Be it known that I, HENRY A. KOHMAN, a citizen of the United States, residing at Pittsburgh, in the county of Allegheny and State of Pennsylvania, have invented a new and useful Improvement in Ferments and Processes for Producing and Preserving the Same, of which the following is a specification.

This invention relates to a newly-discovered ferment, and a novel and useful method of preparing it so that it may be used at any time as a leaven for salt-rising bread.

A certain kind of bread, commonly known as salt-rising bread, which is quite popular in some sections of the country, is made by uncertain methods which depend for their success upon the accidental introduction of the necessary bacteria into the leaven from the air or the ingredients used; consequently, such bread rises very irregularly and often fails to rise. While such irregularities were largely overcome in the preparation of "yeast" bread with the advent of dried and later compressed yeast, salt-rising bread is still being made by uncertain spontaneous fermentation methods. It was early observed that a portion of the ferment used in making "yeast" bread could be saved in suitable vessels for consecutive bakings, and this led to the manufacture of dried and compressed yeast. Salt-rising ferment, on the other hand cannot be saved for consecutive bakings by the ordinary methods used for conserving yeast, for it soon loses its gas producing powers, or in common vernacular, "works itself out," and consequently, in practice each baking depends upon an accidental or spontaneous fermentation.

I have discovered that the ferment in salt-rising bread is not yeast, as is maintained in the literature on the subject, but bacteria. In fact, bacteria have been considered a contamination of yeast, and yeast makers have ever tried to produce a ferment as free as possible from bacteria. In salt-rising bread, on the other hand, I have found that yeast plays no part and that the bread is leavened entirely by bacteria. The bacteria produced by my method aerate the bread by attacking and decomposing certain of its constituents, principally the sugars and starches, into gaseous products. This ferment is non-alcoholic, and therefore differs essentially from the alcoholic fermentation produced by yeast or budding fungi. Alcoholic fermentation results in the production of about equal quantities of alcohol and carbon-dioxid, the latter of which aerates the bread, while the bacteria provided by my method produce no alcohol and the gases consist of about two-thirds hydrogen and one-third carbon-dioxid. I have also discovered that under certain conditions the salt-rising bacteria can be prepared in a dry state, in which they keep for months without appreciable deterioration and can be used as desired in making salt-rising bread, with aerating results much more uniform and regular than is possible by the practice of the ordinary methods.

The object of the invention, therefore, is the production of a non-alcoholic bacterial ferment which is simple and cheap to prepare, which can be kept indefinitely and used when desired, and which is reliable and certain in its aerating action. In attaining this object, I have discovered that a certain bacterium may be isolated from the flora of micro-organisms teeming in fermenting salt-rising bread, which can be used in pure culture to make better and more uniform bread than is possible by means of a spontaneous fermentation. This organism can be isolated by ordinary plating methods, using preferably milk agar-agar plates. A detailed description of the cultural characteristics of this organism is given below:

1. The organism is rod-shaped.
2. It forms very resistant spores.
3. Liquefies gelatin.
4. Grows well in milk, forming a curd which is carried to the surface by the gas given off, leaving clear whey below.
5. It is a facultative anaerobe, for it can grow either in the absence or presence of air.
6. Grows well in the broth with the evolution of gas and the formation of cloudiness.
7. On agar-agar plates it forms opaque colonies. On milk plates the colonies are surrounded by a clear zone, indicating peptonization of the milk casein.
8. It grows on agar-agar slants, forming raised, opaque streaks, which may spread over a large part of the surface.
9. When kept in the liquid media such as milk, broth, etc., or even on agar-agar media, this bacillus loses its gas-producing powers within a few days and while it may thereafter be propagated indefinitely, it cannot be restored to its original condition in which it produces gases.

10. The gases produced by the described bacillus consist of approximately one-third carbon dioxid and two-thirds hydrogen.

11. Its optimum temperature is about 40° C.

In order to grow the culture in quantities for commercial purposes, I take in approximately the following proportions: 475 grams of some starchy material, preferably corn meal, and 50 grams of bi-carbonate of soda, mix them thoroughly and cook the mixture in 3000 grams of milk or water for a sufficient time to sterilize it. Then I inoculate this material with the spores of the organism I have isolated and allow to ferment at a temperature of about 37° C. until the mass becomes well filled with gas bubbles. Then I mix with this fermenting mass 10 pounds of wheat flour or some other starchy material and 10 pounds of water heated to 50° C. After it rises well, I spread it out in thin layers and dry it either in air or artificially by the application of heat. Under these conditions the bacteria pass from the vegetative state into spores. This dried product, which I call starter, when ground or powdered and mixed with the following substances in approximately the proportions given, constitutes an efficient salt-rising "leaven:" 21 parts corn-meal, 3 parts "starter", 1 part bi-carbonate of soda, 1 part carbonate of calcium.

The organism is peculiar in that it very readily loses its gas-producing powers when kept in media that contains much water, such as all ordinary culture media, dough, etc., but when dried under the conditions described it forms spores and keeps for a long time without deterioration.

The salt-rising leaven described herein can be used with any ordinary formula for making salt-rising bread, for example, for household purposes, the following formula is a good one:

*Leaven.*—Take 1 cupful of milk in a quart cup. Place quart cup upon stove until milk boils well. Stir into the boiling hot milk enough salt-rising leaven to stiffen (about 5 or 6 teaspoonfuls). Wrap up well and place in a warm place over night (about 10 hrs.) or until it is light.

*Sponge.*—Take 1¼ cupfuls of water, as hot as the hand can bear, in a bowl and add about 2 cupfuls of flour. Then add the leaven from the quart cup and stir with a spoon until mixed. Place the bowl in a warm place until the sponge rises well about 1 to 1½ hrs. A good way to keep the sponge warm is to place the bowl in warm water. The water should be body temperature or a little warmer.

*Dough.*—Take 1¼ cups of hot water (almost boiling) and dissolve in it 4 teaspoonfuls of sugar, 1 teaspoonful of salt, 2 teaspoonfuls of lard and add 6 or 7 cups of flour. Then add the sponge and mix well. Add more flour if necessary to make a rather soft dough. Mold the bread into loaves at once. Put in a warm place to rise 1 to 1½ hrs. and bake in the usual way.

Salt rising bread is close-grained and it should not be made as light as other bread. The essential thing in making this bread is to keep it warm.

For bakery purposes the process is very much the same, although the proportion of leaven to other ingredients may be much smaller. One pound of leaven is sufficient to make four or five hundred loaves of bread. For example, in using this product on a large scale, approximately the following proportions may be used:

*Leaven.*—7½ lbs. milk, 1 lb. leaven.
*Sponge.*—92 lbs. water, 90 lbs. flour.
*Dough.*—92 lbs. water, 210 lbs. flour, 7 lbs. salt, 10 lbs. lard, 15 lbs. sugar.

This formula makes about 500 loaves of bread scaled at 1 lb. each.

While bicarbonate of soda and carbonate of calcium are particularly recommended in making the leaven, I do not desire to be specifically limited to such carbonates, but desire to also include such other edible or wholesome carbonates of the alkali metals group, as potassium, sodium and lithium, and of the alkaline earth metals group, as calcium and strontium, if desired.

What I claim is:

1. A bread leaven comprising a dried bacterial ferment which liberates carbon dioxid and hydrogen and in which the spores have been developed and which is produced from a starchy material and a carbonate of the alkali or alkaline earth metals, containing developed spores.

2. A bread leaven comprising a dried bacterial ferment which liberates carbon dioxid and hydrogen and in which the spores have been developed and which is produced from a starchy material and sodium carbonate.

3. A bread leaven comprising a dried bacterial ferment which liberates carbon dioxid and hydrogen in proportions of about one to two and in which the spores have been developed and which is produced from a starchy material and a carbonate of the alkali or alkaline earth metals, containing developed spores.

4. A bread leaven comprising a dried bacterial ferment which liberates carbon dioxid and hydrogen and in which the spores have been developed and which is produced from a starchy material, bicarbonate of soda and calcium carbonate.

5. A bread leaven comprising a dried bacterial ferment which liberates carbon dioxid mixed with a suitable loading body and dried to effect spermulation forming a crude leaven, and mixed with a body of cornmeal, bicarbonate of soda, and carbonate of sodium.

9. A bread leaven comprising a bacterial ferment in which the spores have been developed and which is produced from a ... drying the same to produce a ... ment in which the spores have been developed.

HENRY A. KOHMAN.

Witnesses:
SAMUEL E. HOKOMB,
H. STEVENSON.